Oct. 18, 1966   SEIZO TAKEBAYASHI   3,279,279
CRANKSHAFT FOR MULTI-STAGE ROTARY PISTON ENGINE
Filed March 30, 1964   2 Sheets-Sheet 1

INVENTOR
SEIZO TAKEBAYASHI

BY Wenderoth, Lind & Ponack

ATTORNEYS

United States Patent Office 3,279,279
Patented Oct. 18, 1966

3,279,279
CRANKSHAFT FOR MULTI-STAGE ROTARY
PISTON ENGINE
Seizo Takebayashi, Hiroshima-shi, Japan, assignor to Toyo Kogyo Company Limited, Hiroshima-ken, Japan, a company of Japan
Filed Mar. 30, 1964, Ser. No. 355,594
3 Claims. (Cl. 74—597)

The present invention relates to a crankshaft for a multi-stage rotary piston internal combustion engine, and more particularly to a crown gear-type coupling between the crankshaft sections in the stages.

It is well known that the type of rotary piston internal combustion engine which has a combustion chamber within which a generally polygonal shaped piston rotates with the apexes in contact with the internal peripheral wall of the combustion chamber wall and which has the piston eccentrically mounted on the crankshaft, will produce a greater output than a reciprocating piston-type internal combustion engine for the same piston displacement. It is also well known that by arranging a plurality of reciprocating pistons along a single crankshaft, the output of the crankshaft will be the sum of the outputs of the individual pistons. The construction of such an arrangement for a reciprocating piston internal combustion engine is relatively simple, because the engine can be constructed in a top half and a bottom half and the two halves put together around the crankshaft.

With a rotary piston engine, however, it is desirable that there be no joints in the wall of the combustion chamber so that the engine casing cannot be made in top and bottom halves. Thus because the casing, and hence the side wall thereof, should be made in one piece, the crank pin, which is larger than the crankshaft so as to make the piston rotate eccentrically of the crankshaft, cannot be inserted into a partially assembled multi-stage engine through the crankshaft bearings, but must be assembled in the individual stages. The crankshaft with the crank pins thereon must therefore be made in sections corresponding to the individual stages of the engine, and then the stages assembled to make the complete multi-stage engine. The connection of the crankshaft of a thus assembled engine has caused much difficulty in the art.

There have been suggestions as to how to make the crankshaft and crank pins integral, but this involves making special crankshaft bearings and gearing for the piston and the crankshaft, which arrangements have proved difficulty to use satisfactorily in practical operation of the engine.

It is an object of the present invention to provide a crankshaft for a multi-stage rotary piston internal combustion engine which is easily assembled and which keeps the various pistons at the correct angles relative to each other.

It is a further object of the present invention to provide a crankshaft for such an engine which is comprised of sections for the various stages of the engine, the sections being connected by crown gearing on the ends of the sections of the crankshaft.

Other and further objects of the invention will become apparent from the following specification and claims, taken together with the accompanying drawings, in which:

Figure 1:
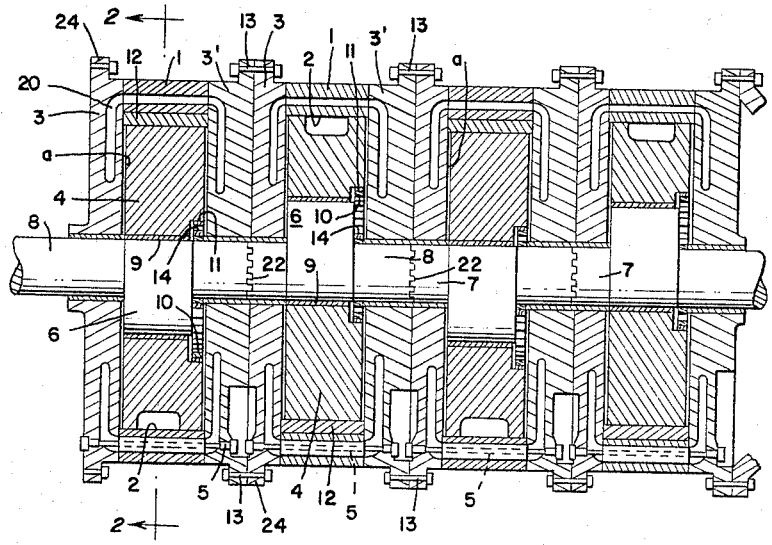
FIG. 1 is a longitudinal sectional view through a multi-stage rotary piston internal combustion engine showing the crankshaft according to the present invention.

Referring to the figures, each stage of the engine has an annular center casing 1 having an internal peripheral wall 2 of generally trochoidal shape having an intake port 2a and an exhaust port 2b at appropriate positions around the periphery thereof, and having a spark plug 2c at a third position. The intake port, exhaust port and spark plug can also be located on the side wall, and when two intake ports, exhaust ports and spark plugs are provided, one set of them may be positioned on the peripheral wall and other set on the side wall. Against the opposite sides of the center casing are substantially flat side walls 3 and 3' which are bolted to the center casing 1 by bolts 5 or the like. Chambers 20 for circulation of a cooling medium through the engine are provided in appropriate locations. The center casing and side walls define within them a combustion chamber $a$.

Positioned within each combustion chamber $a$ is a polygonally shaped rotary piston 4 having a plurality of apexes which are moved along the internal wall 2 of the center casing 1 during rotation of the piston. At the apexes of the piston are sealing members 12 which form a seal between the piston and the wall 2 during the rotation of the piston.

Extending through the center of the combustion chamber $a$ is a crankshaft section 8 which is rotatably mounted in cylindrical crankshaft bushings 16 fixed in the side walls 3 and 3'. The bushings 16 which are between adjacent stages serve as the bushing for both stages, each such bushing extending from the chamber $a$ of one stage to the chamber $a$ of the adjacent stage. Integral with the crankshaft section 8 is a crank pin 6 which is essentially positioned with respect to the axis of the crankshaft section 8, and which is rotatably positioned within an axial aperture in the piston 4 in a bushing 9 fitted within the axial aperture. Fixed in a recess in one side of the piston 4, which recess is substantially the same shape as the axial aperture in the piston in which the crank pin is positioned, is an internal gear 10 which is fixed to the piston 4 by means of a bushing 11. Mounted on the crankshaft bushing 16 and meshing with the internal gear 10 is an external gear 14.

On the ends of each crankshaft section 8 are crown gear teeth 22 which are adapted to form a crown gear coupling 7 when mated with the teeth on the end of another crankshaft section. The pitch of teeth 22 is selected to enable positioning of the pistons 4 relative to each other around the axis of the crankshaft to balance the engine. To form a multi-stage rotary piston internal combustion engine, a plurality of single stages are assembled with the crankshafts 8 having the pistons 4 assembled thereon on the crank pins 6, and the center casing 1 and the side walls 3 and 3' assembled around the crankshaft section 8 and the piston 4. Thereafter, the separate stages are placed side by side and the opposed ends of the crankshaft sections 8 have the teeth 22 of the coupling meshed with each other with each of the pistons 4 in the various stages being at the proper angular position around the axis of the crankshaft relative to the other pistons in the other stages.

When the teeth 22 of the couplings 7 are meshed with each other, the opposed side walls of adjacent stages abut each other, and bolts 13 are bolted through bolt apertures in flanges 24 on the side walls 3 and 3', thereby securing the stages to each other and keeping the couplings 7 engaged.

The engine can then be operated in the conventional manner, the pistons being rotated by the firing of the sparkplugs 2c which are fired in the proper sequence and time intervals to produce a series of properly timed impulses on the crankshaft which act to rotate the crankshaft. Exhausting of products of combustion is through the exhaust port 2b and the intake of fresh combustible gas is through the intage ports 2a. The conveying away of the exhaust gases is by means of a conventional exhaust system, not shown, and the feed of combustible gases is through a conventional carburation system, also not shown, while the timing of the firing of the spark plugs and the supply of voltage to them is through a conventional ignition system, not shown.

Figure 2:
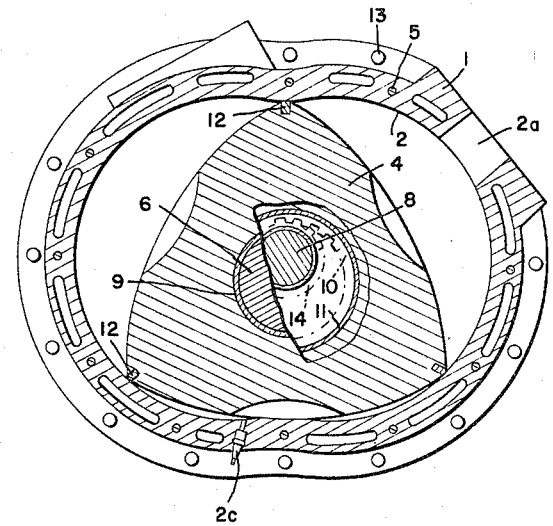
FIG. 2 is a sectional view taken on line 2—2 of FIG. 1.
Figure 3:
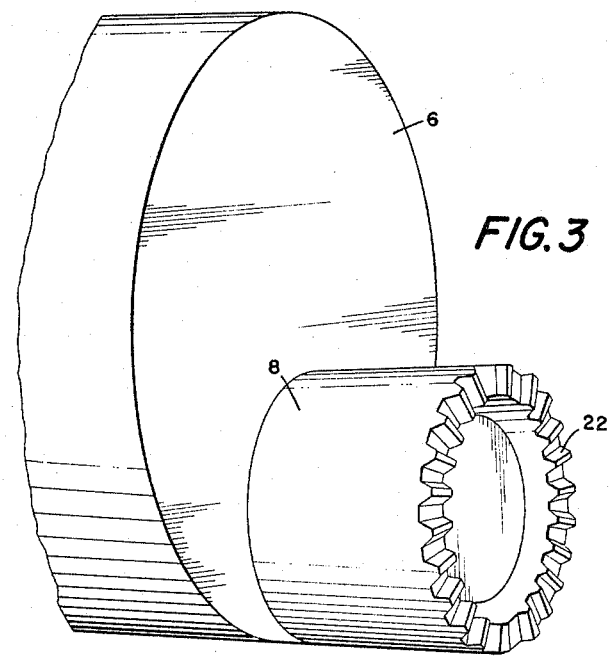
FIG. 3 is a perspective view, on an enlarged scale, of an end of one section of the crankshaft.
Figure 4:
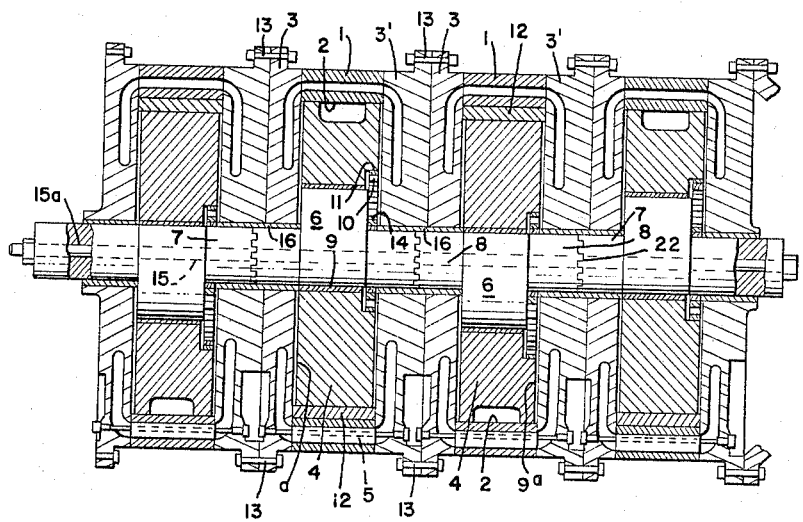
FIG. 4 is a longitudinal sectional view similar to FIG. 1 showing a modified form of crankshaft.

The modified crankshaft shown in FIG. 4 is the same as that of FIGS. 1–3, except that it has a longitudinal axial bore 15a through each of the sections thereof in which is positioned a bolt 15 which extends through all of the crankshaft sections 8 for holding them tightly together in the axial direction.

There has thus been provided a crankshaft for a multi-stage rotary piston-type internal combustion engine in which the crankshaft, although made in separate sections, one for each stage, can nevertheless be coupled into a single crankshaft for all of the stages such that the sections act together and such that the pistons in the various stages can be positioned in the proper positions relative to the pistons in the other stages and will maintain these positions. The bushings for the crankshaft are cylindrical and are undivided, and only a single bushing supports the shaft between pistons. The advantages of making the engine casings without a joint dividing them into an upper half and a lower half are retained, while the advantages of having a crankshaft which acts in the same manner as one which is actually integral throughout all of the stages are achieved. The manufacture of the separate sections of the shaft is simple and the assembly of the stages individually and with each other is likewise simple. The provision of the longitudinal axial bolt through the several sections of the crankshaft provides additional means for securing the shaft sections to each other in the longitudinal direction tightly and firmly.

It is the thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A crankshaft for a multi-stage rotary piston-type internal combustion engine in which each stage has an annular center casing and side walls closing the center casing and defining a combustion chamber therein, a polygonally shaped rotary piston rotatably positioned within each combustion chamber, and intake, exhaust and firing means for each combustion chamber, the stages being in side-by-side abutting position, said crankshaft comprising a plurality of aligned, joined sections, one for each stage, an eccentrically positioned crank pin on each stage adapted to be rotatably positioned within the piston, and a plurality of crown gear teeth on the ends of said sections engaged with the teeth on the next adjacent sections forming a coupling between the adjacent crankshaft sections, and a single cylindrical crankshaft bushing around each coupling between crankshaft sections, said bushing being as long as the distance between the combustion chambers of the adjacent stages of the engine, each crankshaft section having a longitudinal axial bore therethrough, and a bolt extending through the aligned bores in the crankshaft sections securing the sections to each other in the axial direction.

2. In a rotary piston internal combustion engine having axially spaced multiple combustion chambers, the combination comprising a plurality of axially spaced pairs of one piece side walls each having a journal bearing bore opening axially through the center thereof; a plurality of one piece cylindrical bushings, one extending between the opposed walls of each adjacent pair of side walls and having a sufficient length to extend the full length of aligned bearing bores opening through the opposed side walls of adjacent pairs of side walls and being secured in the journal bearing bores for securing the coincidence of the central axes of the bearing bores in the opposed side walls; a plurality of annular casings, one for each combustion chamber and secured between the side walls of each pair to define a combustion chamber therewith; a plurality of crankshaft sections, one for each combustion chamber and extending through the respective chambers; each of the said crankshaft sections having an eccentric substantially midway of the axial length thereof and shaft portions extending longitudinally in opposite directions from said eccentric and being journaled in the bushings in the side wall bearing bores, each eccentric having a diameter larger than the diameter of the said bearing bore and said bushing; a plurality of crown gear teeth having a pitch enabling coupling of the respective crankshaft section with the next adjacent crankshaft section with equiangular rotational displacement of the said eccentrics relative to each other for balancing the engine; a plurality of rotary pistons, one for each combustion chamber and journaled on the respective eccentrics for eccentric rotary motion; a plurality of pairs of gears, each pair consisting of a one-piece external gear and a one-piece internal gear, there being one pair for each rotary piston with the external gear being mounted on the bushing and being coaxial with the crankshaft shaft portion and meshing with the said internal gear, said internal gear being secured to the said piston.

3. The combination as claimed in claim 2 in which each crankshaft section has an axial bore therethrough, and a bolt extending through the aligned bores in the crankshaft sections securing the sections to each other in the axial direction.

References Cited by the Examiner

UNITED STATES PATENTS

| | | | |
|---|---|---|---|
| 290,565 | 12/1883 | Fry | 74—597 |
| 447,386 | 3/1891 | Vuillier | 74—571 |
| 797,555 | 8/1905 | Carlson | 123—90 |
| 2,491,630 | 12/1949 | Voorhies | 123—193 |
| 3,062,435 | 11/1962 | Bentele | 123—8 |

FRED C. MATTERN, Jr., *Primary Examiner.*

BROUGHTON G. DURHAM, *Examiner.*

W. S. RATLIFF, *Assistant Examiner.*